(12) United States Patent
Tsai et al.

(10) Patent No.: US 8,480,286 B2
(45) Date of Patent: Jul. 9, 2013

(54) LIGHT GUIDE APPARATUS FOR BACKLIGHT MODULE

(75) Inventors: Chung-Lin Tsai, Taoyuan (TW); Guo-Chen Lee, Taoyuan (TW)

(73) Assignee: Global Lighting Technologies Inc., Taoyuan (TW)

( * ) Notice: Subject to any disclaimer, the term of this patent is extended or adjusted under 35 U.S.C. 154(b) by 193 days.

(21) Appl. No.: 13/172,882

(22) Filed: Jun. 30, 2011

(65) Prior Publication Data

US 2012/0170317 A1     Jul. 5, 2012

Related U.S. Application Data

(63) Continuation-in-part of application No. 12/464,104, filed on May 12, 2009, now Pat. No. 7,997,784.

(51) Int. Cl.
*F21V 7/04*     (2006.01)

(52) U.S. Cl.
USPC ............... 362/630; 349/58; 349/65; 362/611; 362/612; 362/631

(58) Field of Classification Search
USPC ..................... 349/58, 65; 362/97.1, 611–614, 362/621, 630, 631
See application file for complete search history.

(56) References Cited

U.S. PATENT DOCUMENTS

| 7,997,784 B2 * | 8/2011 | Tsai ............................. 362/630 |
| 2005/0052860 A1 * | 3/2005 | Tsai ............................... 362/97 |
| 2006/0050532 A1 * | 3/2006 | Stadtwald-Klenke ........ 362/612 |
| 2006/0104091 A1 * | 5/2006 | Chen et al. .................... 362/621 |

* cited by examiner

*Primary Examiner* — Stephen F Husar
(74) *Attorney, Agent, or Firm* — Jianq Chyun IP Office

(57) ABSTRACT

A light guide apparatus for a backlight module is disclosed, which includes a light guide plate, a circuit having a plurality of circuit contacts integrated with the light guide plate, and a light source disposed on the light guide plate and electrically contacted to the plurality of circuit contacts.

12 Claims, 5 Drawing Sheets

LIGHT GUIDE APPARATUS FOR BACKLIGHT MODULE

CROSS-REFERENCE TO RELATED APPLICATION

This application is a continuation-in-part application of and claims the priority benefit of a prior application Ser. No. 12/464,104, filed on May 12, 2009, now U.S. Pat. No. 7,997,784. The entirety of each of the above-mentioned patent applications is hereby incorporated by reference herein and made a part of this specification.

BACKGROUND OF THE INVENTION

1. Field of the Invention

The present invention relates to a light guide structure including a light guide plate and a light source, and being adapted for a backlight module.

2. The Prior Arts

Backlight modules are now widely used in many kinds of electronic products. For example, displays of notebook computers, mobile phones, and liquid crystal televisions do not emit light by themselves, and require backlight modules for providing light sources.

A typical backlight module includes a light guide plate and a light source. Light emitting diodes (LED) are often employed serving as light sources of backlight modules for those electronic products demanding a relatively thin thickness. With respect to such a backlight module, the LED light source is positioned at a lateral side of the light guide plate. The light guide plate has a first surface and a second surface opposite to the first surface. A reflective sheet is provided at the first surface, and a plurality of optical sheets including a diffusing sheet and a prism sheet are provided at the second surface. An outer frame is provided for framing all of the components. In operation, the LED light source emits a light, and the light is inputted into light guide plate from the lateral side of the light guide plate. A part of the light is reflected by the reflective sheet, and sequentially passes through the diffusing sheet and the prism sheet, and is then outputted therefrom.

When serving for a backlight module having a relatively small area, the light sources are usually provided at one lateral side of the light guide plate. However, when serving for a backlight module having a relatively large area, if the light sources are only provided at one side of the light guide plate, the light inputted into the light guide plate gradually attenuates while being transmitted to the other side of the light guide plate. This often causes a nonuniform illuminating condition of the light guide plate. As such, a large size light guide plate is often provided with light sources at both sides for solving the problem of the single side light sources.

FIG. 1 is a schematic diagram illustrating a conventional backlight module including a light guide plate and light sources assembled together. Referring to FIG. 1, no matter the light sources are provided to one side, two sides, or even more sides of the light guide plate 1, the conventional backlight module is generally configured by providing LEDs 2 onto a circuit board 3, and then assembling the LEDs 2 and the circuit board together to the lateral side(s) of the light guide plate 1. Accordingly, in fabricating such a backlight module, the LEDs 2 must be previously welded to the circuit board 3. Then, the circuit board 3, together with the LEDs 2 welded thereon, is secured to the light guide plate 1. As such, the process of the fabrication is relatively complex, and needs a high fabrication cost.

SUMMARY OF THE INVENTION

A primary objective of the present invention is to provide a solution to the problem of the conventional backlight module, in which the fabrication process of providing the LEDs serving as light sources to the light guide plate is complex and costly.

An embodiment of the invention provides a light guide apparatus for a backlight module, which includes a light guide plate, a circuit having a plurality of circuit contacts integrated with the light guide plate, and a light source disposed on the light guide plate and electrically contacted to the plurality of circuit contacts. The circuit can be arranged on a front surface of the light guide plate. The circuit can be arranged on a rear surface of the light guide plate. The circuit can be arranged on a side surface of the light guide plate.

The light guide plate may further have a recessed compartment for receiving the light source. The recessed compartment can be a recess. The recessed compartment can be a hole. The recessed compartment can be disposed at a lateral side of the light guide plate. The recessed compartment can be disposed adjacent to a lateral side of the light guide plate. The recessed compartment can be disposed near a center area of the light guide plate. The recessed compartment can be disposed at a side surface of the light guide plate. The plurality of circuit contacts are extended and arranged on an inner surface of the recessed compartment.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
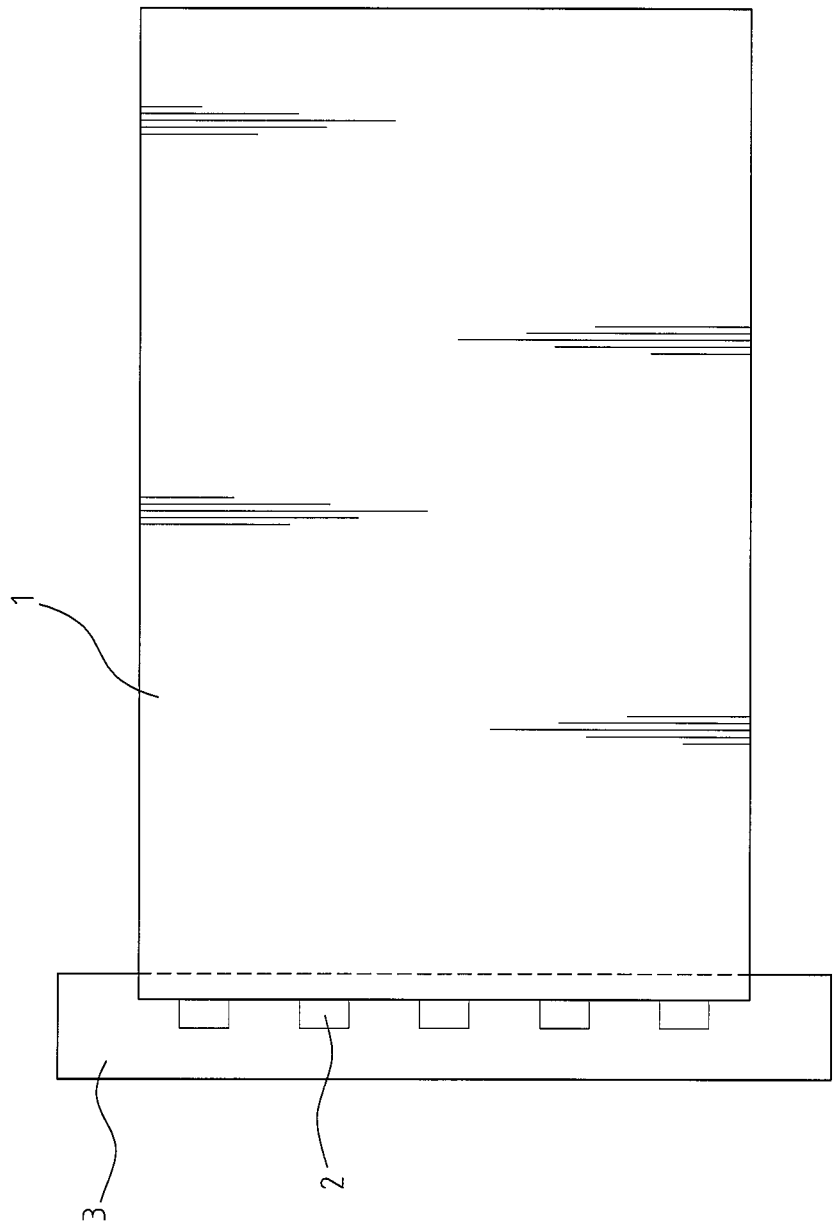
FIG. 1 is a schematic diagram of a conventional backlight module including a light guide plate and light sources assembled together.
Figure 2:
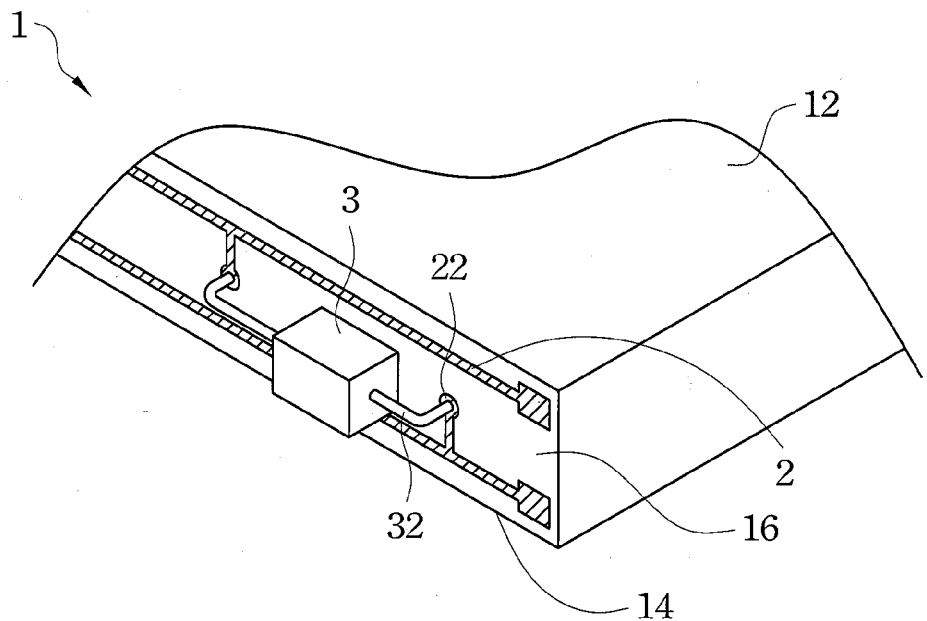
FIG. 2 is an oblique diagram of a first embodiment of a light guide apparatus for a backlight module of the invention.

FIG. 2 is an oblique diagram of a first embodiment of a light guide apparatus for a backlight module of the invention. The light guide apparatus for a back light module includes a light guide plate 1, a circuit 2 integrated with the light guide plate 1, and a light source 3. The circuit 2 has a plurality of circuit contacts 22. The light source 3 is disposed on the light guide plate 1 and electrically connected to the circuit contacts 22.

The light guide plate 1 includes a front surface 12, a rear surface 14, and a side surface 16. The front surface 12 is a light-emitting surface of the light guide plate 1, i.e. the light is emitted from the front surface 12 of the light guide plate 1. The rear surface 14 is opposite to the front surface 12, and the light is mostly reflected by the rear surface 14. The side surface 16 connects the front surface 12 and the rear surface 14.

The circuit 2 and the circuit contacts 22 thereof are arranged on the side surface 16 of the light guide plate 1. The light source 3 provides light to the light guide plate 1. The light source 3 is disposed on the side surface 16 of the light guide plate 1 and is electrically connected to the circuit contacts 22. The light source 3 is a light emitting diode with pins 32, and the pins 32 can be electrically connected to the circuit contacts 22. The pins 32 can be terminal type pins.

Figure 3:
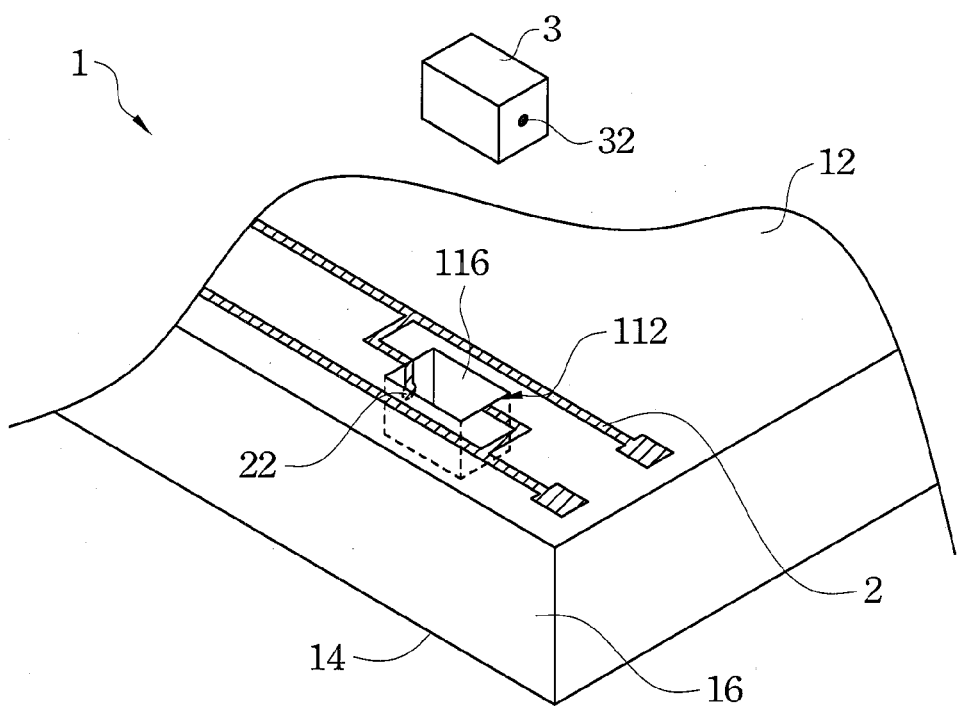
FIG. 3 is an explosive diagram of a second embodiment of the light guide apparatus for backlight module of the invention.

FIG. 3 is an explosive diagram of a second embodiment of the light guide apparatus for backlight module of the invention. The light guide plate 1 further includes a recessed compartment for receiving the light source 3. The recessed compartment can be a recess 112. The recess 112 is disposed adjacent to the lateral side of the light guide plate 1. The circuit 2 is arranged on the front surface 12 of the light guide plate 1, and the circuit contacts 22 are extended and arranged at an inner surface 116 of the recess 112. The pins 32 of the light source 3 are electrically connected to the circuit contacts 22. The pins 32 are pad type pins.

Figure 4:
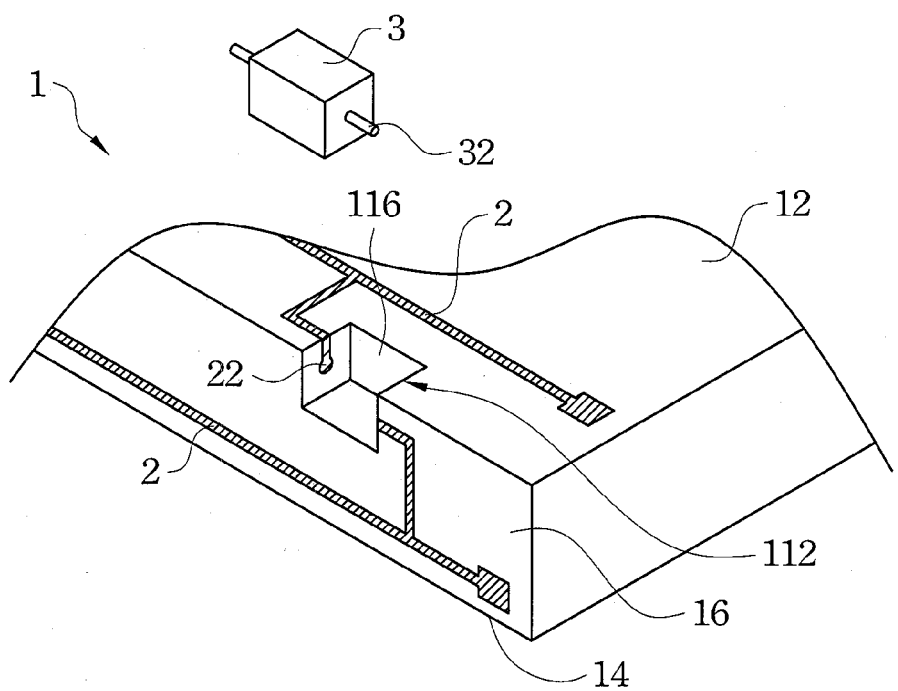
FIG. 4 is an explosive diagram of a third embodiment of the light guide apparatus for backlight module of the invention.

FIG. 4 is an explosive diagram of a third embodiment of the light guide apparatus for backlight module of the invention. The recessed compartment on the light guide plate 1 in this embodiment is the recess 112. The recess 112 is disposed at a lateral side of the light guide plate 1. The circuit 2 is arranged on the front surface 12 and the side surface 16 of the light guide plate 1. The circuit contacts 22 are extended and arranged on the inner surface 116 of the recess 112. The pins 32 of the light source 3 are electrically connected to the circuit contacts 22. The pins 32 can be terminal type pins.

Figure 5:
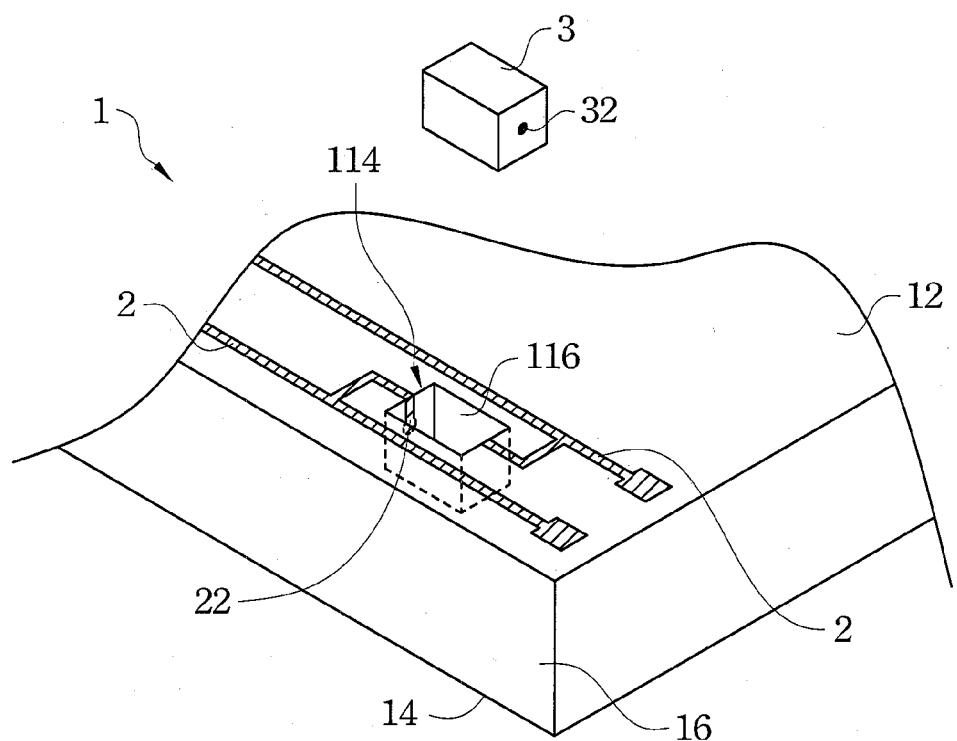
FIG. 5 is an explosive diagram of a fourth embodiment of the light guide apparatus for backlight module of the invention.

FIG. 5 is an explosive diagram of a fourth embodiment of the light guide apparatus for backlight module of the invention. The recessed compartment in this embodiment is a hole 114 passing through the light guide plate 1. The hole 114 is disposed adjacent to the lateral side of the light guide plate 1. The circuit 2 is arranged on the front surface 12 of the light guide plate 1. The circuit contacts 22 are extended and arranged on the inner surface 116 of the hole 114. The pins 32 of the light source 3 are electrically connected to the circuit contacts 22. The pins 32 can be pad type pins.

Figure 6:
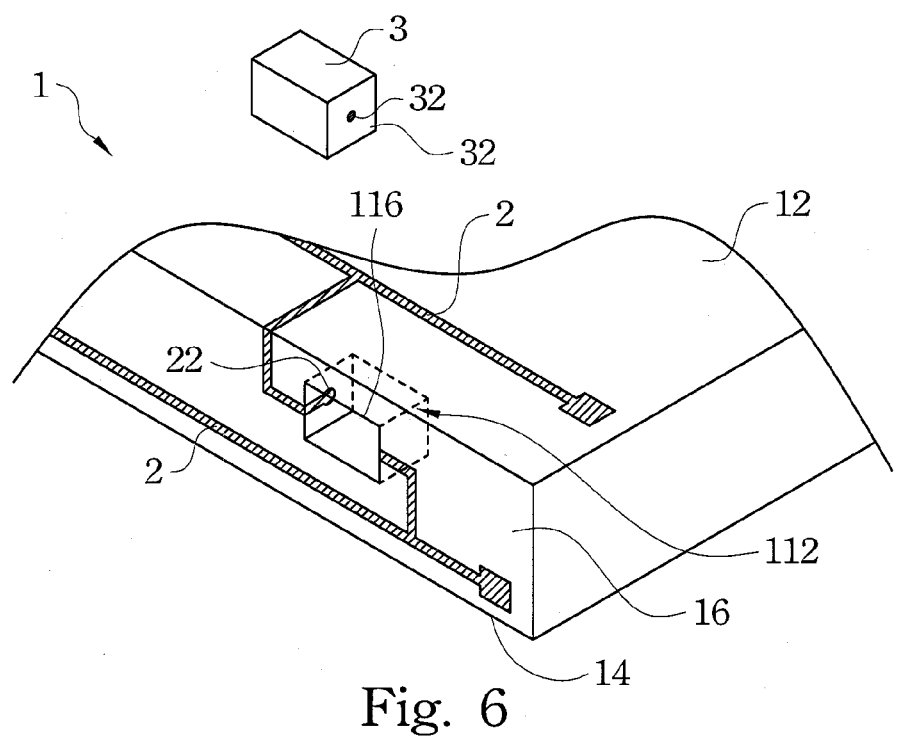
FIG. 6 is an explosive diagram of a fifth embodiment of the light guide apparatus for backlight module of the invention.

FIG. 6 is an explosive diagram of a fifth embodiment of the light guide apparatus for backlight module of the invention. The recessed compartment in this embodiment is the recess 112 disposed at the side surface 16 of the light guide plate 1. The circuit 2 is arranged on the front surface 12 and the side surface 16 of the light guide plate 1. The circuit contacts 22 are extended and arranged on the inner surface 116 of the recess 112. The pins 32 of the light source 3 are electrically connected to the circuit contacts 22. The pins 32 can be pad type pins.

Although the light source 3 and recessed compartment are illustrated singular in above embodiments, the number of the light source 3 and the recessed compartment can be plural. Each of the recessed compartments can receive one or more light source.

Figure 7:
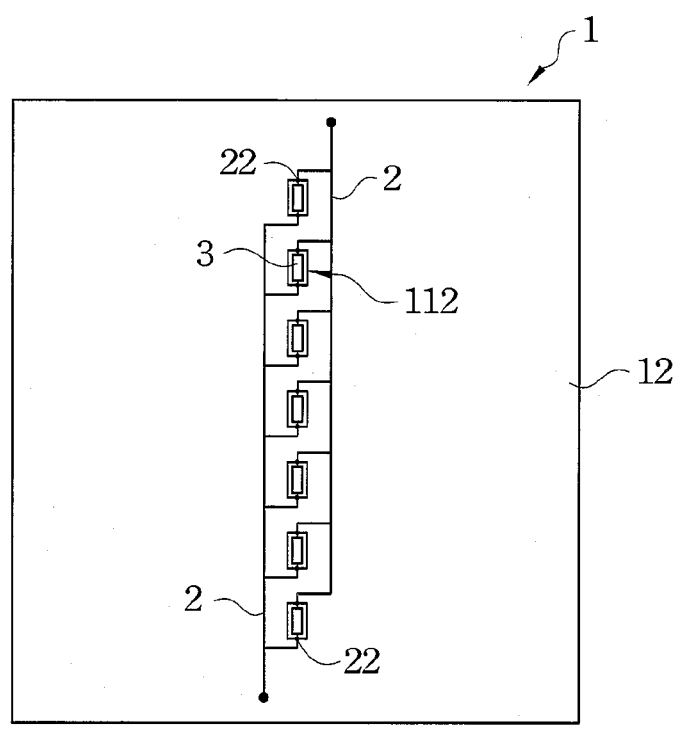
FIG. 7 is a schematic diagram of a sixth embodiment of the light guide apparatus for backlight module of the invention.

FIG. 7 is a schematic diagram of a sixth embodiment of the light guide apparatus for backlight module of the invention. The recessed compartment includes plural recesses 112 disposed near a center area of the light guide plate 1. Plural light source 3 are disposed in the recesses 112, and the light sources 3 face different directions in order to provide uniform light toward the light guide plate 1. The circuit 2 is arranged at the front surface 12 of the light guide plate 1, and the light sources 3 are electrically connected to the circuit contacts 22 of the circuit 2.

Figure 8:
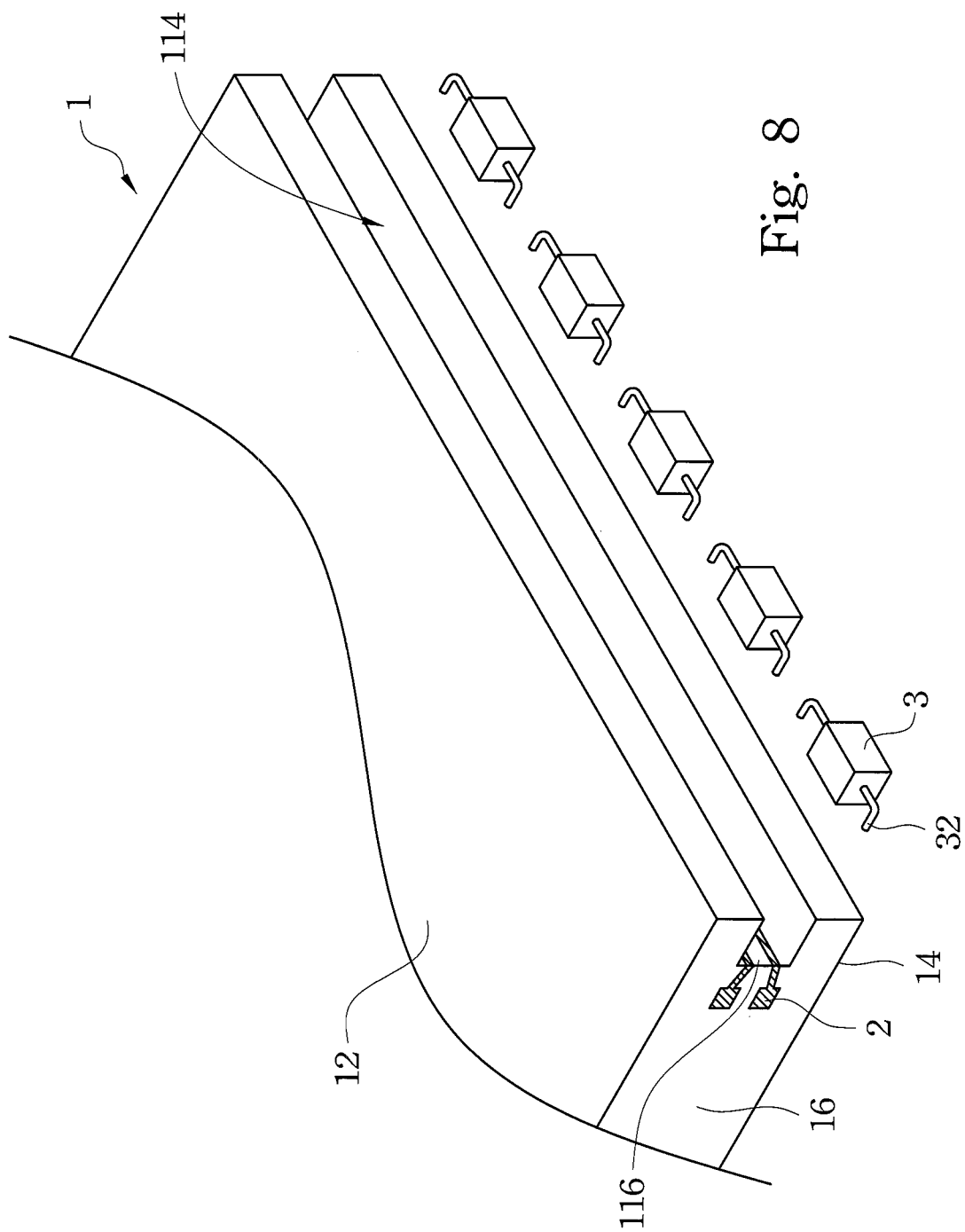
FIG. 8 is an explosive diagram of a seventh embodiment of the light guide apparatus for backlight module of the invention.

FIG. 8 is an explosive diagram of a seventh embodiment of the light guide apparatus for backlight module of the invention. The recessed compartment in this embodiment is a hole 114 passing through the light guide plate 1. The hole 114 is disposed at the side surface 16 of the light guide plate 1. The circuit 2 is arranged on the side surface 16 of the light guide plate 1. The circuit contacts 22 are extended and arranged on the inner surface 116 of the hole 114. The pins 32 of the light source 3 are electrically connected to the circuit contacts 22. The pins 32 can be terminal type pins.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light guide apparatus for a backlight module comprising:
    a light guide plate;
    a circuit having a plurality of circuit contacts integrated with the light guide plate; and
    a light source disposed on the light guide plate and electrically contacted to the plurality of circuit contacts.

2. The light guide apparatus of claim 1, wherein the circuit is arranged on a front surface of the light guide plate.

3. The light guide apparatus of claim 1, wherein the circuit is arranged on a rear surface of the light guide plate.

4. The light guide apparatus of claim 1, wherein the circuit is arranged on a side surface of the light guide plate.

5. The light guide apparatus of claim 1, wherein the light guide plate has a recessed compartment for receiving the light source.

6. The light guide apparatus of claim 5, wherein the recessed compartment is a recess.

7. The light guide apparatus of claim 5, wherein the recessed compartment is a hole.

8. The light guide apparatus of claim 5, wherein the recessed compartment is disposed at a lateral side of the light guide plate.

9. The light guide apparatus of claim 5, wherein the recessed compartment is disposed adjacent to a lateral side of the light guide plate.

10. The light guide apparatus of claim 5, wherein the recessed compartment is disposed near a center area of the light guide plate.

11. The light guide apparatus of claim 5, wherein the recessed compartment is disposed at a side surface of the light guide plate.

12. The light guide apparatus of claim 5, wherein the plurality of circuit contacts are extended and arranged on an inner surface of the recessed compartment.

\* \* \* \* \*